United States Patent
Koteskey

(10) Patent No.: US 6,811,692 B2
(45) Date of Patent: Nov. 2, 2004

(54) BRISTLED SEPTIC FILTER

(75) Inventor: Gary L. Koteskey, Boyne City, MI (US)

(73) Assignee: Sim-Tech Filter, Inc., Boyne City, MI (US)

( * ) Notice: Subject to any disclaimer, the term of this patent is extended or adjusted under 35 U.S.C. 154(b) by 230 days.

(21) Appl. No.: 10/022,702

(22) Filed: Dec. 13, 2001

(65) Prior Publication Data

US 2003/0111399 A1 Jun. 19, 2003

(51) Int. Cl.⁷ .............................................. B01D 35/02
(52) U.S. Cl. ...................... 210/238; 210/484; 210/496; 210/497.01; 210/463
(58) Field of Search ................................. 210/238, 484, 210/496, 497.01, 497.1, 463, 494.1, 494.2; 4/288, DIG. 4; 15/398–399, 401–402, 22.1–22.2, 207.2, DIG. 5, 104.05, 104.067, 104.2, 143.1, 206

(56) References Cited

U.S. PATENT DOCUMENTS

| | | | | |
|---|---|---|---|---|
| 877,324 A | * | 1/1908 | Gilbert | 131/245 |
| 1,935,128 A | * | 11/1933 | Pullman | 4/286 |
| 2,690,569 A | * | 10/1954 | Kozerski | 4/292 |
| 2,763,104 A | * | 9/1956 | Lindenberg | 451/469 |
| 3,332,552 A | | 7/1967 | Zabel | 210/86 |
| 3,527,351 A | | 9/1970 | Wade | 210/356 |
| 3,582,140 A | * | 6/1971 | Kaufman et al. | 300/21 |
| 3,616,914 A | | 11/1971 | Reid | 210/107 |
| 3,862,461 A | * | 1/1975 | Bucklitzsch | 15/164 |
| 4,167,482 A | | 9/1979 | Müller | 210/68 |
| 4,504,391 A | * | 3/1985 | Weems, Sr. | 210/307 |
| 4,710,295 A | | 12/1987 | Zabel | 210/336 |
| 4,783,259 A | | 11/1988 | Wade | 210/169 |
| 5,423,621 A | * | 6/1995 | Russell | 401/9 |
| 5,580,453 A | | 12/1996 | Nurse, Jr. | 210/323.2 |
| 5,582,716 A | | 12/1996 | Nurse, Jr. | 210/121 |
| 5,582,744 A | * | 12/1996 | Abel | 210/808 |
| 5,593,584 A | | 1/1997 | Nurse, Jr. | 210/346 |
| 5,645,732 A | | 7/1997 | Daniels | 210/747 |
| 5,683,577 A | | 11/1997 | Nurse, Jr. | 210/170 |
| 5,690,824 A | | 11/1997 | Stuth | 210/333.01 |
| 5,762,790 A | | 6/1998 | Zoeller | 210/238 |
| 5,762,793 A | | 6/1998 | Nurse, Jr. | 210/323.2 |
| 5,885,452 A | | 3/1999 | Koteskey | 210/309 |
| 5,904,847 A | | 5/1999 | Bovington | 210/416.1 |
| 6,122,792 A | * | 9/2000 | Roy | 15/104.2 |
| 6,136,190 A | * | 10/2000 | Zoeller et al. | 210/299 |
| 2002/0000016 A1 | * | 1/2002 | Hsieh | 15/164 |
| 2003/0084913 A1 | * | 5/2003 | Gueret | 132/218 |
| 2003/0088933 A1 | * | 5/2003 | Woods et al. | 15/167.1 |

* cited by examiner

*Primary Examiner*—Terry K. Cecil
(74) *Attorney, Agent, or Firm*—Brinks Hofer Gilson & Lione

(57) ABSTRACT

A filter for use in a waste water discharge system including a first channel defining a receptacle for a filter and a second channel connected generally orthogonally to the first channel providing an outlet from the filter receptacle. The filter has an axial support of a pre-selected length, a plurality of bristles fixed to the axial support extending radially outward to define an outer margin. The outer margin of the bristles, at some portions along the pre-selected length, are at least equal to an inside dimension of the channel defining the receptacle. A handle is fixed to the axial support facilitating the placement and withdrawal of the filter element in the filter receptacle. A shield member is provided that is generally conformable to the inside surface of the filter receptacle. The shield member has a length dimension sufficient to cover the outlet leading to the second channel for blocking any flow of waste water into the second channel during replacement of the filter element.

9 Claims, 2 Drawing Sheets

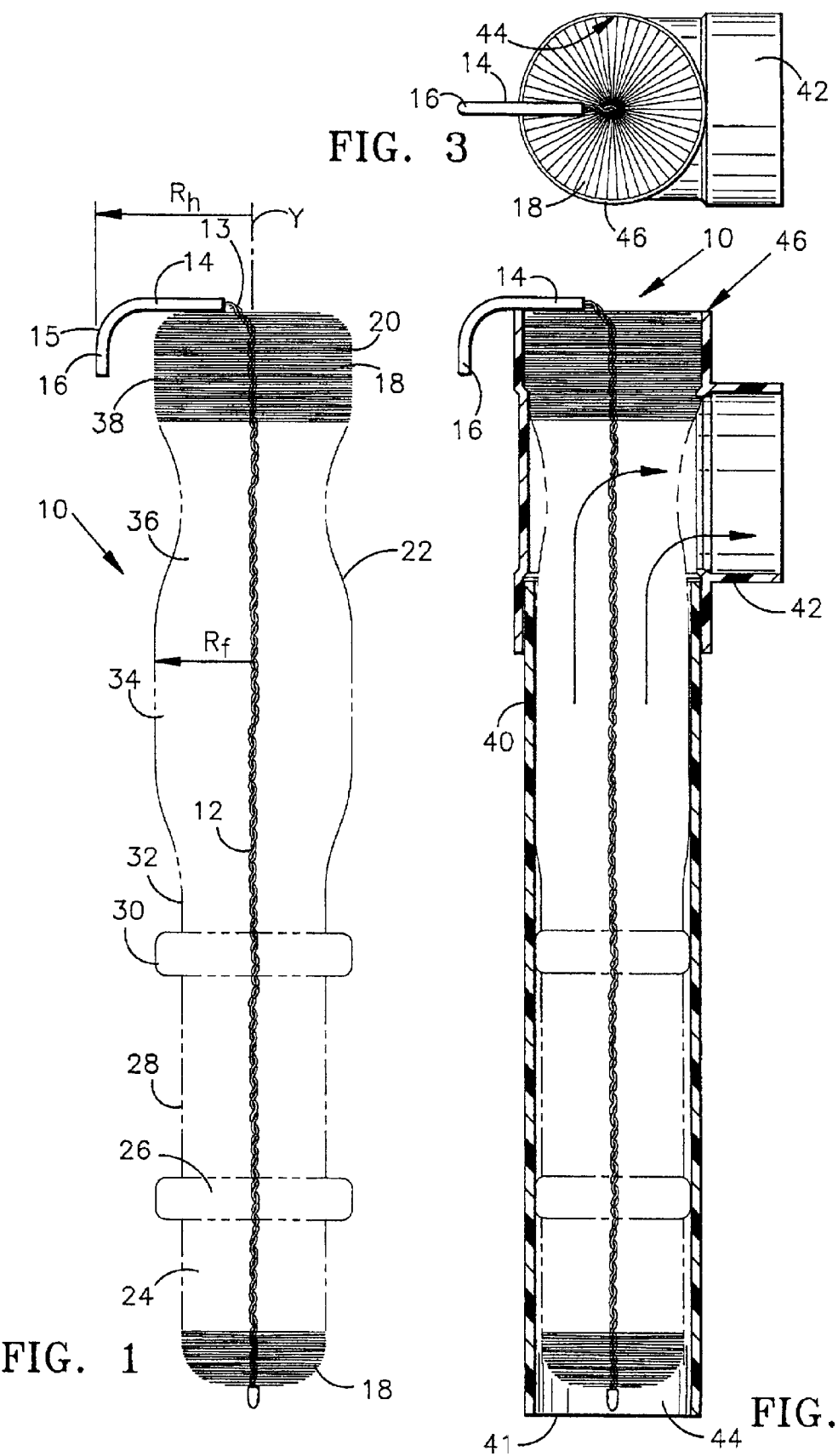

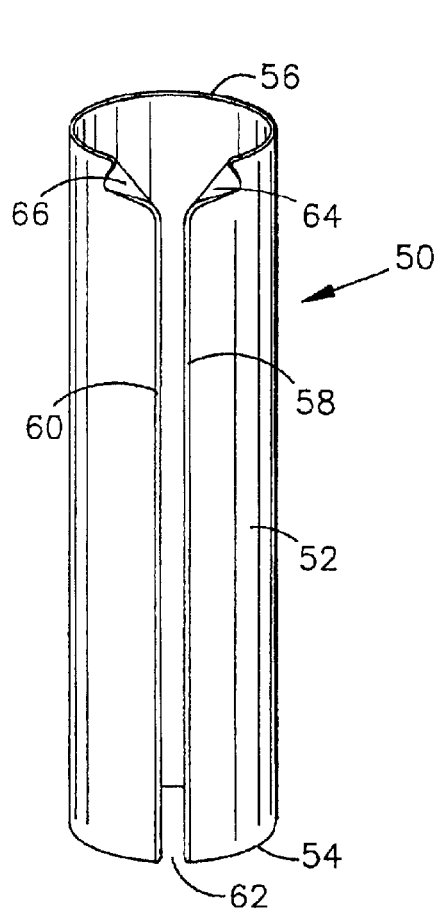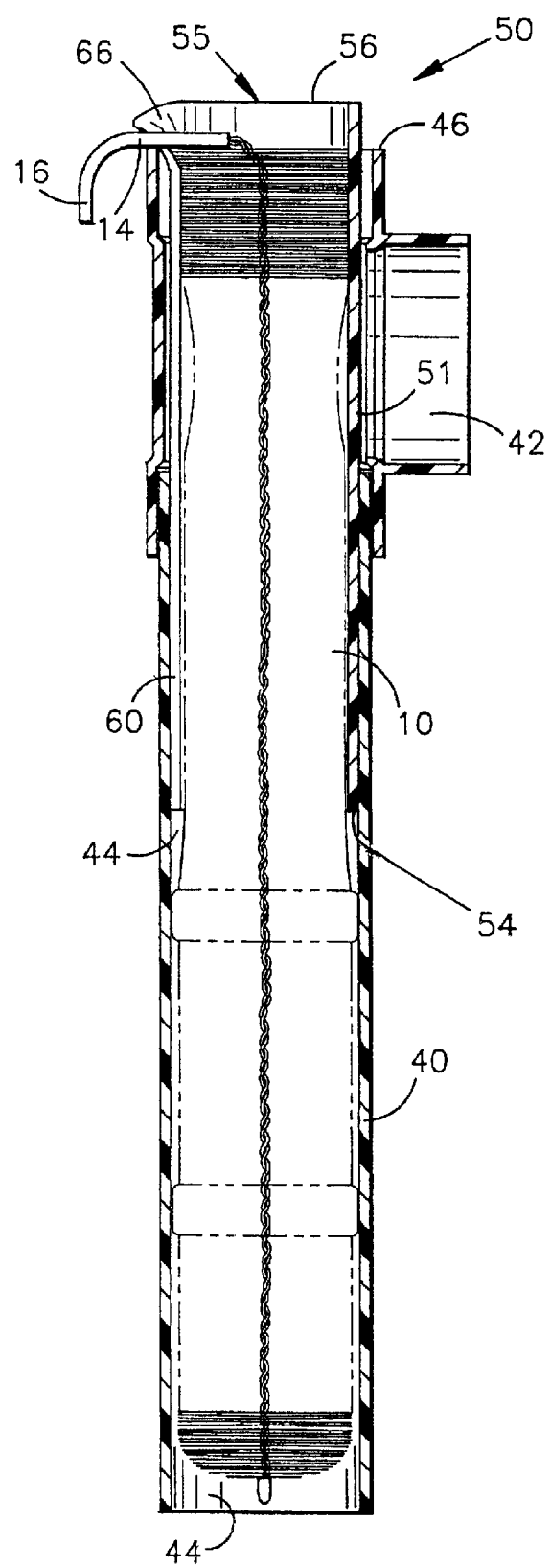

BRISTLED SEPTIC FILTER

BACKGROUND OF THE INVENTION

This invention pertains generally to filters for use in waste water treatment, particularly to filters intended for filtering liquid effluent exiting a septic tank prior to final introduction of the liquid to a distribution field. The invention has utility in both gravity fed septic to field distribution systems as well as in pumped outlets such as those used in low pressure mound sanitary drainage systems.

Conventional drainage fields for receiving the output of septic tank sewage effluent are generally in the form of network of perforated finger pipes connected to an outlet of the septic tank and situated in trenches on top of a filter bed generally consisting of rock, crushed stone, gravel, sand, or a combination thereof. Such systems normally operate by gravity flow, however, it is common practice to connect a pump to the septic tank to aid in moving the sewage effluent from the septic tank and through the drainage field, particularly where required by the lay of the land or other criteria leading to the adoption of such a design. The sewage effluent is distributed through the network of perforated pipes and trickles onto and through the filter bed, where its nutrient content is reduced by microbial action. After passing through the filtering material, the sewage effluent is absorbed by the soil surrounding and underlying the trench. Critical to the continued operation of such a system is the maintenance of an open system of perforations in the pipes connected to the outlet of the septic tank as well as in the filter bed and underlying soil. Usefulness is limited, however, by clogging of the openings in the drain field finger pipes, stone, sand, and soil pores from semisolid debris flowing from the septic tank or by solids such as leaves and grass which can enter the effluent tank during servicing or resulting from a loosely fitting effluent tank cover. As the pipe openings, filter bed, and underlying soil become blocked, flow of effluent is reduced and the sanitary drainage system can be rendered inoperative.

In order to prevent the drain field finger pipe openings, filter bed, and underlying soil from clogging, solid material present in the effluent should be removed prior flow into the drain field. Currently available effluent apparatus include filtering devices having a filter disposed in fluid connection between the septic tank and the drain field, such as those described in U.S. Pat. Nos. 3,332,552; 4,710,295; 5,382, 357; 5,580,453; 5,593,584; 5,683,577; 5,762,790; 5,762, 793; 6,136,190; and 6,267,882. Other filters have been employed at the input of an effluent pump, for instance those devices and systems described in U.S. Pat. Nos. 5,492,635; 5,427,679; and 4,439,323, and filters in fluid connection to the input of a septic pump, as described, for instance, in U.S. Pat. No. 5,582,716. Solid material present in effluent should be removed prior to the flow into the drain field and can be filtered by such devices, thereby helping to prevent clogging. However, the filtering orifices defined by these devices do not filter efficiently and effectively, and frequently become clogged, requiring cleaning and servicing of the filtering apparatus.

Common to many of the filters disclosed in the prior art is a canister wall or housing in which the filter is located. When the filter becomes clogged and requires cleaning or replacement, many filters lose some or most of the debris that has been held back. Frequently, the entire canister needs to be removed from the fluid piping or chamber system in which it is installed. Frequently, the outlet tees containing the canisters are not aligned with an access port to the septic tank in which it is located, thus requiring some manipulation of the clogged canister during removal or replacement, making most current filters unusable because of their rigidity. Any manipulation tends to disturb some of the material extracted by the filter, making the whole process somewhat disagreeable, and contributing to the outflow of particulate matter into the finger field, which is just what the filter is intended to prevent. Even more disagreeable are those filters in the prior art that, due to the high initial cost, are often disassembled, cleaned and reinstalled rather than being simply withdrawn and replaced with a new filtering unit.

What is needed is a low cost filtering element. What is also needed is a filtering element that is light weight and flexible even in cold climates so that it is easily replaced even in less than optimum physical arrangements. What is further needed is a filtering element that is sufficiently adaptable to fit a variety of sizes of filtering chambers, tees and baffles. What is additionally needed is a replacement kit that provides a means for preventing outflow of particulates into the finger field during the filter replacement process. What is also needed is a filter having a large total filtering surface area so that efficient and effective filtering action occurs at good flow rates. What is further needed is a filter that can remove the smallest particulates of hair, tissue, lint, and other materials yet is easily replaced and properly discarded at the end of its useful life.

SUMMARY OF THE INVENTION

A filter element of the present invention is intended for use in waste water discharge systems. The filter element generally comprises an axial support of a pre-selected length. A handle is fixed to the axial support to facilitate the placement and withdrawal of the filter element. A plurality of bristles are fixed to and extend radially outward from the axial support to an outer margin. The outer margin of the bristles defines a substantially continuous surface generally symmetric about the axial support. The outer margin generally includes a plurality of portions defining a first selected radius of the filter element. At least two of the plurality of portions are separated by an intermediate portion wherein the bristles terminate short of the first selected radius.

The axial support desirably occupies as little of the cross-section of the filter as possible. The axial support is preferably somewhat flexible to ease the installation and withdrawal of the filter element. The can be achieved by having the axial support comprise a spiral wound set of wires, the bristles being captured between the set of wires. The wires can be of any suitable material such as galvanized steel, aluminum, or stainless steel, the stainless steel being preferred due to the longevity imparted to the filter by such a construction.

The bristles can be straight, crimped, convoluted or otherwise shaped to maximize the filtering efficiency of the filter without presenting undue back pressure to the passing fluid. While the bristles can have a cross-section that is round or oval, they preferably have a cross-section that enhances the surface area of the bristle fibers such as hexagonal, pentagonal, square, triangular, or even star shaped to enhance the small particle filtering capacity. The bristles should be somewhat flexible to aid in the installation and withdrawal of the filtering element. The bristles should also be resilient or shape retentive so that upon placement of the filter element into a chamber, the filtering element will generally self align in the middle of the chamber and will not be significantly deformed by the flow of fluid through the filter, even when partially loaded with extracted particulate material from the waste water. The bristles are desirably resistant to biological degradation and generally inert to the typical chemicals present in waste water. Suitable materials for forming the bristles include synthetic polymeric materials such as aliphatic polyamides, aromatic polyamides, polyolefins, polyvinyl chloride, polyurethane, fluoropolymers, polyvinylidene chloride, polystyrene and styrene copolymers, and particularly polyesters, polypropylene, polyethylene or nylon. The outer margin of the bristles is generally axially symmetric with respect to the axial support, but is not of uniform diameter throughout the length of the filtering element. The outer margin can include several convolutions or indentations, which typically enhance the filtering function of the filter element by causing selective settling of the particulate matter filtered from the waste water in preferred spaced locations along the length of the filter rather than uniformly, or with a constant gradient, throughout the length of the filter. Preferably there is an additional indentation aligned with the expected location of any outlet to the finger field. The outermost dimension of the bristles forming the outer margin is preferably slightly larger than the expected interior dimension of the chamber or pipe into which the filter is expected to be installed to ensure that no significant portion of the waste water passes around the filter. A wide range of filtering capacities can be created by using bristles of different cross-section, shape, diameter, polymeric make-up and density.

The handle must be securely fixed to the axial support so that even after prolonged presence in a septic tank, the handle will afford easy handling of the filtering element. A preferred form for the handle is simply a unitary extension of the axial support. Preferably the handle extends radially to only one side of the axial support by a distance sufficient to have a terminal portion extend beyond the outermost portion of the outer margin defined by the bristles. Further, the handle preferably includes a further portion that extends parallel to the axial support at a position separated from the axial support by a distance greater than the outer margin defined by the bristles. This later feature allows the handle to overlie a terminal end of any pipe or chamber into which the filter element can be inserted, thereby ensuring that the filtering element is secured in place within the filtering chamber, and does not slip out the bottom of the filtering chamber.

The replacement of a filtering element of the present invention is facilitated by the use of a shield member for temporarily covering the outlet to the finger field during the replacement. The shield member generally comprises a sheet of material that is generally conformable to the inside surface of the filter receptacle. The shield member has a length dimension sufficient to cover the outlet leading to the finger field to block any outward flow of waste water during replacement of the filter element. The shield member preferably has a width dimension selected so that the margins defining the width dimension are spaced from each other by a distance sufficient to allow the shield member to pass by the handle when inserted into the filter receptacle. The deformable character of the bristles of the filter element of the present invention facilitate the installation of the shield at the time of filter replacement. With the shield member in place, the existing filter can be quickly withdrawn from the filter receptacle and a new filter slipped in to replace the old filter. With the new filter in place so that the handle is aligned with the space between the lateral margins of the shield member, the shield member can be slipped out of the filter receptacle, thus re-opening the outlet to the finger field and reinitiating the filter process.

The filtering elements of the present invention can be used singly or can be grouped in a parallel array to process a larger volume of liquid or a highly contaminated flow of liquid as might be present in a commercial situation. The filtering element have particular utility in septic systems, but can be used in other circumstances where a low to moderate rate of flow axially through a generally tubular opening is expected.

With these general characteristics in mind, a further understanding of certain features and advantages will emerge from a study of the following description and the accompanying figures of a preferred embodiment illustrating the best mode of carrying out the invention.

BRIEF DESCRIPTION OF THE DRAWINGS

FIG. 1 is a side elevation view of a bristled septic filter of the present invention.

FIG. 2 is a sectional view of the bristled septic filter of FIG. 1 shown installed in the outlet of a septic tank.

FIG. 3 is a top plan view of FIG. 2.

FIG. 4 is a perspective view of a shield member of the present invention.

FIG. 5 is a sectional view similar to FIG. 2 showing the shield member of FIG. 4 in place during replacement of the bristled septic filter of the present invention.

DESCRIPTION OF PREFERRED EMBODIMENTS

A filtering element 10 of the present invention is shown partially in outline in FIG. 1. The filter element 10 is shown to comprise an axial support 12, which in the preferred illustrated embodiment takes the form of a twisted stainless steel wire 13. A handle 14 can be fixed to the axial support 12. The handle 14 can take the form of a tubular element 15 having a sufficiently large interior diameter to receive the support 12. The handle 14 can be secured to the support 12 by welding, cementing, bonding, mechanically crimping, or by other equivalent means. Alternatively, a handle can be formed merely from a lateral extension of the axial support 12. The axial support 12 is generally aligned with the axis of rotation Y located through the vertical center of the filter element 10. The handle 14 projects to one side of the filter by a distance $R_h$ which is greater than the largest outside radius $R_f$ of the filter element 10. A proximal end 16 of handle 14 is turned downwardly and aligned generally parallel to the axis of rotation Y.

The filter 10 is further defined by a plurality of bristles 18 that project radially outward from the support 12 around the circumference of, and substantially along the entire length of, the filter element 10. The bristles 18 are shown in the preferred form to be cut in a circularly symmetric pattern about the axis Y. The outer ends 20 of the plurality of the bristles 18 are preferably cut, shaved or otherwise sculpted so as to define an outer margin 22 of the filter. The outer margin 22 defines a substantially continuous surface, which is generally symmetric about the axial support 12 and the axis of rotation Y. As illustrated, the filter 10 is effectively divided into a plurality of sections based on the radius or length of the bristles within each section.

In one preferred form of a filter of the present invention, the lower-most portion 24 is separated from a nearby cylindrical portion 28 having a similar bristle radius by a first intermediate portion 26 having a much larger bristle radius. Likewise, the cylindrical portion 28 is separated from an indented portion 32 of similar radius by a second intermediate portion 30 having a greater bristle radius. Near the top of the filter element 10, a larger radius bristle portion 34 is separated portion 36. While at least to some degree the particular design for the outer margin 22 is merely a choice of design, there are some functional aspects that affect the design choice. For example, during use, it has been observed that particulate matter from the passing waste water tends to gather more densely in the portions 26, 30 and 34, and immediately below the portions having larger radius. Somewhat lower fractions of particulate matter are observed in the lower segments of the smaller radius portions 24, 28 and 32. Thus, each of the portions 14–34 of the filter element 10 can be considered as a filtering stage in which particulates of a given character are observed to accumulate together in a three-dimensional pattern. It will be appreciated that this accumulation of particulate matter increases with time and that at sometime the filter probably will have to be replaced to retain the necessary and/or desirable flow characteristics.

FIG. 2 shows the filter 10 of FIG. 1 installed with a filter receptacle 40 leading to an outlet 42 from a septic tank waste water settling tank in which the filter receptacle 40 is installed. The filter receptacle 40 can be conveniently configured from common materials used in the industry such as four-inch plastic sewer pipe or other similar materials capable of withstanding a wastewater environment. Wastewater is intended to flow into the filter element through the lower end 41 of the filter receptacle 40 as show in FIG. 2 and, after passing lengthwise through majority of the length of the filter 10 exit through opening 42, which can lead to further treatment facilities or disposal arrangements of various design and conventional in the trade. In general, the radius of the filter $R_f$ is selected so as to be slightly greater than the inside radius of the filter receptacle 40 to ensure that the outer perimeter 22 of at least portions 26, 30 and 34 abut the inside surface 44 of the filter receptacle 40. The filter is installed so that the handle 14 protrudes over an upper edge 46 of the filter receptacle 40. The generally symmetric configuration of the filter element 10 ensures that the axial support 12 of the filter element will be located to receptacle 40 with the bristles 18 extending radially from support 12 outward the inner surface 44 of receptacle 40 as shown in FIG. 3. This has the effect of self-aligning the filter element 10 in the middle or center of the chamber defined by the filter receptacle 40.

As indicated previously, during use of the filter element 10 there is expected to be an accumulation of particulate matter that increases with time, and that at sometime the filter element 10 probably will have to be replaced to retain the necessary and/or desirable flow characteristics of the overall system in which the filter is installed. The replacement of a filtering element 10 of the present invention is facilitated by the use of a sleeve-like shield member 50 shown in FIG. 4. The shield member 50 comprises a sheet 52 of material that is formed or formable into a generally cylindrical shape as shown in FIG. 4. The sheet 52 includes a lower end 54 an upper end 56 and a pair of longitudinal edges 58 and 60 that are spaced from each other so as to form a linear slot 62. The width of the slot 62 is dimensioned to receive the handle 14 of the filter element 10. Upper corners of the longitudinal edges 58 and 60 are bent outward to form tabs 64 and 66 at the upper edge 56.

Assuming that a filter element 10 is already installed in a filter receptacle 40 as shown in FIG. 2, and requires replacement, that replacement can be facilitated by introducing shield 50 into the filter receptacle 40 between the inside surface 44 of the filter receptacle 40 and the filtering element 10 as shown in FIG. 5. The lower edge 54 can be inserted inside the upper end 46 of the filter receptacle 40 with the slot 62 aligned with handle 14. As the shield 50 is pushed downwardly, the slot 62 allows the longitudinal edges 58 and 60 to straddle opposing sides of the handle 14. The shield 50 is pressed downwardly into the filter receptacle 40 until tabs 64 and 66 contact upper edge 46 of filter receptacle 40. With the shield 50 fully installed as shown in FIG. 5, a blocking portion 51 of the shield 50 substantially prevents any outflow of waste water or other materials into outlet 42. With the shield 50 fully installed, the handle 14 of the filter 10 can be grasped and moved vertically to extract the filter element 10 out a top opening 55 defined by the upper margin 56 of the shield 50 thereby removing the filter element 10 from the filter receptacle 40. A new filter can then be installed through a downward motion until the handle 14 of the new filter 10 is in contact with the upper edge 46 of the filter receptacle 40 and positioned between tabs 64 and 66. Once the new filter 10 is in place, the shield 50 can be vertically withdrawn from the filter receptacle 44 without disturbing the new filter 10, the longitudinal edges 58 and 60 passing on either side of the handle 14 as the shield is being withdrawn. Upon withdrawal of the shield 50, the outlet 42 is again open to permit outward flow of liquid, which has the effect of resuming the filtering action but with a new filter in place.

The filter element 10 and shield 50 can be conveniently packaged as a replacement filter kit for use in replacing the filter element 10 of the present invention. Alternatively, the shield 50 and filter element 10 can be sold separately from each other. In one preferred embodiment, the shield member 50 can be conformable to various inside diameters and the material forming sheet 52 of the shield 50 can be sufficiently thin as to be easily cut so as to ensure adequate spacing of the slot 52 to receive a handle 14 or other similar structure.

A filter element of the present invention is low cost, light-weight and flexible even in cold climates so that it is easily replaced even in less than optimum physical arrangements. A filter element of the present invention is adaptable to fit a variety of sizes of filtering chambers, tees and baffles. A filter element of the present invention has a large total filtering surface area so that efficient and effective filtering action occurs at good flow rates. A filter element of the present invention can remove the smallest particulates of hair, tissue, lint, and other materials yet is easily replaced and properly discarded at the end of its useful life. A filter element of the present invention can be employed in smaller installations as a single filter element, or in larger installations in arrays of filter chambers with the same performance achievements present in both installations.

While the present invention has been described in detail in connection with the illustrated embodiment shown in FIGS. 1 through 5, it will be appreciated that other variations exist which are within the scope and spirit of the appended claims.

What is claimed is:

1. A replacement filter kit for use in replacing a filter element in a waste water discharge system including a first channel defining a receptacle for a filter and a second channel connected generally orthogonally to the first channel providing an outlet from the filter receptacle, the filter kit element comprising: a shield member and a filter element, the filter element having an axial support of a pre-selected length, a plurality of bristles fixed to the axial support and extending radially outward to define an outer margin, the outer margin of the bristles, at some portions along the pre-selected length, being at least equal to an inside dimension of said channel defining the receptacle, and handle means fixed to the axial support facilitating the placement and withdrawal of the filter element in the filter receptacle, the shield member comprising a sheet generally conformable to the inside surface of the filter receptacle, the shield member having a length dimension sufficient to cover the outlet leading to the second channel for blocking any flow of waste water into the second channel during replacement of the filter element, the shield member having two corners bent outward to provide engagement tabs for engaging an upper margin of the first channel.

2. The replacement filter kit of claim 1 wherein the handle comprises a unitary extension of the axial support extending radially to only one side of the axial support by a distance sufficient to overlie a margin of the first channel, the shield member having a width dimension selected so that the margins defining the width dimension are spaced from each other by a distance sufficient to allow the shield member to pass by the handle when inserted into the first channel.

3. The replacement filter kit of claim 1 wherein the sheet forming the shield member is curved to a nearly cylindrical form, two opposing edges of the sheet being separated from each other by a distance sufficient to permit said handle means to pass between the two opposing edges.

4. A shield member for use during the replacement of a filter element in a waste water treatment facility, the shield member comprising a sheet generally conformable to the inside surface of a filter receptacle, the shield member having a length dimension sufficient to cover an outlet of the filter receptacle for blocking any flow of waste water out of the filter receptacle during replacement of the filter element, the shield member having a lateral dimension so that when curved to conform to the inside surface of the filter receptacle the shield assumes a nearly cylindrical form having two opposing edges of the sheet being separated from each other to define a slot, two adjacent corners of the opposing edges being bent outward to provide engagement tabs for engaging an upper margin of the filter receptacle.

5. A filter element and a shield member in a waste water discharge system, the discharge system including a first channel defining a receptacle for a filter and a second channel connected generally orthogonally to the first channel providing an outlet from the filter receptacle, the filter element having an axial support of a pre-selected length, a plurality of bristles fixed to the axial support and extending radially outward to define an outer margin, the outer margin of the bristles, at some portions along the pre-selected length, being at least equal to an inside dimension of said channel defining the receptacle, and handle means fixed to the axial support facilitating the placement and withdrawal of the filter element in the filter receptacle, the shield member comprising a sheet generally conformed to the inside surface of the filter receptacle, the shield member having a length dimension sufficient to cover the outlet leading to the second channel for blocking any flow of waste water into the second channel during replacement of the filter element, the shield member having two corners bent outward to provide engagement tabs for engaging an upper margin of the first channel.

6. The apparatus of claim 5 wherein the handle comprises a unitary extension of the axial support extending radially to only one side of the axial support by a distance sufficient to overlie a margin of the first channel, the shield member having a width dimension selected so that the margins defining the width dimension are spaced from each other by a distance sufficient to allow the shield member to pass by the handle when inserted into or removed from the first channel.

7. The apparatus of claim 5 wherein the axial support comprises a spiral wound set of wires, the bristles being captured between the set of wires.

8. The apparatus of claim 5 the bristles have a cross-sectional diameter of between about 0.2 and 0.004 cm.

9. The apparatus of claim 5 wherein the bristles are present in an amount of between about $10^2$ and $10^4$ per centimeter of length of the axial support.

* * * * *